United States Patent Office 3,705,894
Patented Dec. 12, 1972

3,705,894
MYCOPHENOLIC ACID DERIVATIVES
Koert Gerzon and Richard E. Holmes, Indianapolis, Ind., assignors to Eli Lilly and Company, Indianapolis, Ind.
No Drawing. Continuation-in-part of abandoned application Ser. No. 734,253, June 4, 1968. This application Sept. 24, 1970, Ser. No. 75,281
Int. Cl. C07d 5/34
U.S. Cl. 260—240 R        6 Claims

ABSTRACT OF THE DISCLOSURE

Derivatives of mycophenolic acid having antiviral activity are described. These derivatives are obtained by modification of mycophenolic acid at the carboxyl group, the phenolic hydroxyl group, or both.

CROSS-REFERENCE

This application is a continuation-in-part of copending application Ser. No. 734,253 filed June 4, 1968, now abandoned.

BACKGROUND OF THE INVENTION

Mycophenolic acid is produced by various strains of fungi of the *Penicillium brevicompactum, Penicillium stoloniferum* and *Penicillium urtichae* groups. The compound was the first biologically-active compound isolated from a mold. The initial isolation was carried out by Gosio in 1896 (Gosio, Rivista d'Igiene e Sanita' pubblica, Ann. 7, 825, 869, 961 [1896]). Structure work was effected largely through the efforts of Raistrick et al. from 1932 to 1935 (Raistrick et al., Biochem. J., 26, 1441 [1932]; Biochem J., 27, 654 [1933]).

Mycophenolic acid is known to exhibit antifungal and antibacterial activity, and it has been shown recently to possess antiviral activity as well. Because of the interesting biological activity of mycophenolic acid, many of its easily prepared derivatives, such as salts and esters, have previously been prepared.

SUMMARY

We have now prepared a number of novel mycophenolic acid derivatives having the formula

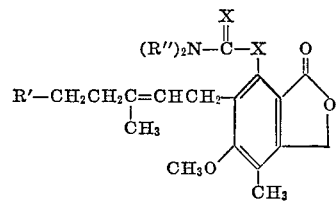

or

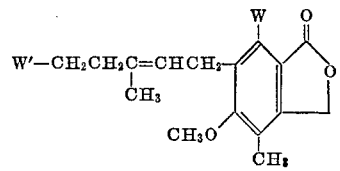

wherein
R' is

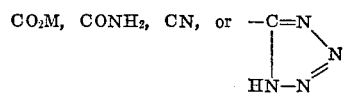

each X independently is oxygen or sulfur with no more than one being sulfur;
each R" independently is hydrogen, $C_1$–$C_4$ alkyl, or $C_1$–$C_4$ haloalkyl;

M is hydrogen, sodium, potassium, magnesium, calcium, $N(R''')_4$, or $C_1$–$C_2$ alkyl;
each R" independently is hydrogen or $C_1$–$C_4$ alkyl;
W is $$OR, \; SR, \; or \; O\overset{O}{\underset{\|}{C}}Z$$

W' is

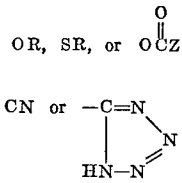

R is hydrogen, sodium, or potassium; and
Z is $C_1$–$C_4$ alkyl or $C_1$–$C_4$ haloalkyl.

These derivatives exhibit activity against a number of viruses.

DESCRIPTION OF THE PREFERRED EMBODIMENT

The novel compounds of our invention are derived from mycophenolic acid by modification of the carboxyl group, the phenolic hydroxyl group, or both. Thus, for example, the phenolic hydroxyl group may be converted to the sodium or potassium salt or to a carbamate or thiocarbamate in which the nitrogen might be substituted with one or two $C_1$–$C_4$ alkyl or $C_1$–$C_4$ haloalkyl groups. Halo is intended to include fluoro, chloro, bromo, and iodo. For example, R" in the above formula is such as methyl, ethyl, propyl, butyl, chloromethyl, 2-bromoethyl, 2-fluoropropyl, 3-iodobutyl, 2,2-difluoromethyl, or 2-chloro-3-bromopropyl. In addition, we have esterified the hydroxyl group with lower aliphatic acids so that Z is such as methyl, chloromethyl, ethyl, propyl, 2-bromopropyl, and fluoromethyl.

Our modification of the side chain comprises conversion of the carboxyl group to a salt, amide, or ester, or replacement of the carboxyl group by a cyano or tetrazolyl group. Typical salts include the sodium, potassium, calcium and magnesium salts, or amine salts wherein R" is such as hydrogen, methyl, ethyl, propyl, or butyl. Lower esters such as the methyl and ethyl esters have been prepared.

The following compounds are illustrative of the novel compounds of our invention.

1-(4-hydroxy-6-methoxy-7-methyl-3-oxo-5-phthalanyl)-3-methyl-5-(1H-tetrazolyl)-2-pentene.
6-(4-acetoxy-6-methoxy-7-methyl-3-oxo-5-phthalanyl)-4-methyl-4-hexenonitrile.
6-(4-hydroxy-6-methoxy-7-methyl-3-oxo-5-phthalanyl)-4-methyl-4-hexenonitrile.
6-[4-(N-butylcarbamoyloxy)-6-methoxy-7-methyl-3-oxo-5-phthalanyl]-4-methyl-4-hexenoic acid.
6-(4-hydroxy-6-methoxy-7-methyl-3-oxo-5-phthalanyl)-4-methyl-4-hexenamide.
6-(4-acetoxy-6-methoxy-7-methyl-3-oxo-5-phthalanyl)-4-methyl-4-hexenamide.
6-[4-(N-propylcarbamoyloxy)-6-methoxy-7-methyl-3-oxo-5-phthalanyl]-4-methyl-4-hexenoic acid,
6-[4-(N-ethylcarbamoyloxy)-6-methoxy-7-methyl-3-oxo-5-phthalanyl]-4-methyl-4-hexenoic acid.
6-[4-(N-β-chloroethylcarbamoyloxy)-6-methoxy-7-methyl-3-oxo-5-phthalanyl]-4-methyl-4-hexenoic acid.
Ethyl 6-[4-(N,N-dimethylthionocarbamoyloxy)-6-methoxy-7-methyl-3-oxo-5-phthalanyl]-4-methyl-4-hexenoate.
Ethyl 6-[4-(N,N-dimethylcarbamoylthio)-6-methoxy-7-methyl-3-oxo-5-phthalany]-4-methyl-4-hexenoate.
6-(4-mercapto-6-methoxy-7-methyl-3-oxo-5-phthalanyl)-4-methyl-4-hexenonitrile.

The in vitro activity of the compounds of this invention against virus growth in tissue culture has been demonstrated against a number of viruses, including measles virus and vaccinia. Thus, such compounds are useful in maintaining scrub solutions, hospital surfaces, cleaning equipment and the like free from viral contamination.

The ability of compounds coming within the scope of the above formula to control the growth of virus in vitro is readily demonstrated by using a plaque suppression test similar to that described by Siminoff, Applied Microbiology, 9 [1], 66–72 (1961). The test is carried out as follows:

Rectangular glass boxes measuring 7½" x 15" 1½", made of pieces of double strength plate glass sealed together with silicone rubber cement, are used in carrying out the test. The glass boxes are covered with a glass lid, and before use, are sterilized by dry heat at a temperature of about 300° C. Approximately $10^6$/ml. BS–C–1 (serial culture of Cercopithecus monkey kidney, Hopps et al.) cell suspension is made in a medium composed of tissue culture medium 199 together with 5 percent of calf serum penicillin (150 units/ml.), and streptomycin (150 meq./ml.). Two hundred and fifty milliliters of the suspension are added to each sterilized glass box and the box is incubated at about 37° C. for about 96 hours in a level position. After incubation, the medium is carefully drawn off leaving a monolayer of cells undisturbed on the glass. The cells are then infected by gently adding to each box about 100 ml. of a suspension of measles virus, Edmondston strain, in medium 199. After allowing a time of from about 1 to about 3 hours for adsorption of the measles virus on the cells, the infecting medium is removed from the plate. A mixture of 75 ml. of double strength medium 199 with calf serum, penicillin, and streptomycin and 75 ml. of double strength agar (Difco purified) solution (2 percent) at 50° C. is poured over the virus-infected cell monolayer in each box and allowed to solidify at a level attitude. Filter paper disks are dipped in solutions of the substances to be tested, dried in a vacuum oven at no higher than 37° C. for about one hour, and then placed on the surface of the agar in the boxes. The boxes are incubated at about 37° C. for about 84 hours, and are then flooded with aqueous 10 percent Formalin-2 percent sodium acetate solution, and the agar is floated off with water. The cells remaining are stained with Wright's stain. Toxicity, antiviral activity, and the microscopic appearance of the cells are recorded following the procedure of Herrmann et al., Proc. Soc. Exp. Biol. and Med., 103, 625 (1960).

Plaques are seen in those areas of the plate where the virus has infected and reproduced in the cells. Zones of toxicity are also observed and the diameter thereof measured in millimeters when the test compound kills the cells under and around the filter paper disk. Antiviral activity of the test compounds is detected by observing the absence of plaques and a heavier growth of cells in a zone under and around a filter paper disk, the diameter of this zone being measured in millimeters.

The cells in a zone of activity are examined with a microscope to determine the presence and degree of drug and/or virus damage. The staining is graded 1+, 2+, 3+, 4+, and negative to reflect the following:

4+: Dark stained areas which, upon microscopic examination, show healthy cells with no visible virus or drug damage;

3+: Less darkly stained areas that show no virus or drug damage but appear less healthy;

2+: Areas showing healthy cells with a moderate amount of virus breakthrough;

1+: Areas showing healthy cells with a greater virus breakthrough;

—: No viable cells.

Table I which follows sets forth the results of the testing of several of our compounds against measles virus (Edmondston strain) and vaccinia (VI Lindeman). In the table, column 1 gives the name of the compound; column 2, the concentration in terms of mcg./ml. at which the compound was applied to the filter paper disks; column 3, the grading of stained areas; and column 4, the name of the virus against which the compound was tested.

TABLE I

| Compound | Conc., mcg./ml. | Rating | Virus |
|---|---|---|---|
| 6-(4-acetoxy-6-methoxy-7-methyl-3-oxo-5-phthalanyl)-4-methyl-4-hexenonitrile | 500 | 4+ | Vaccinia. |
| | 250 | 3+–4+ | Measles. |
| 1-(4-hydroxy-6-methoxy-7-methyl-3-oxo-5-phthalanyl)-3-methyl-5-(1H-tetrazolyl)-2-pentene | 500 | 2+–3+ | Vaccinia. |
| | 125 | 4+ | Measles. |
| 6-(4-hydroxy-6-methoxy-7-methyl-3-oxo-5-phthalanyl)-4-methyl-4-hexenonitrile | 500 | 2+–3+ | Vaccinia. |
| | 125 | 4+ | Measles. |
| Ethyl 6-[4-(N,N-dimethylthionocarbamoyloxy)-6-methoxy-7-methyl-3-oxo-5-phthalanyl]-4-methyl-4-hexenoate | 500 | | Vaccinia. |
| | 500 | 4+ | Measles. |
| Ethyl 6-[4-(N,N-dimethylcarbamoylthio)-6-methoxy-7-methyl-3-oxo-5-phthalanyl]-4-methyl-4-hexenoate | 500 | 2+–3+ | Vaccinia. |
| | 500 | 4+ | Measles. |
| 6-(4-mercapto-6-methoxy-7-methyl-3-oxo-5-phthalanyl)-4-methyl-4-hexenoate | 500 | | Vaccinia. |
| | 125 | 4+ | Measles. |
| 6-[4-(N-ethylcarbamoyloxy)-6-methoxy-7-methyl-3-oxo-5-phthalanyl]-4-methyl-4-hexenoic acid | 125 | 4+ | Vaccinia. |
| | 125 | 4+ | Measles. |

The compounds of our invention may be prepared using procedures well known to those skilled in the art. For example, the nitriles may be obtained from the corresponding amides by treatment with p-toluenesulfonyl chloride in pyridine. Treatment of the nitrile with sodium azide results in the tetrazolyl compound. The carbamates aer formed by reaction of the phenolic hydroxyl group with the appropriate carbamoxyl chloride or isocyanate.

The preparation of our compounds will be further illustrated by the following specific examples. Where analyses are indicated by symbols of elements, analytical results obtained for these elements were within ±0.4 percent of the theoretical values. Each analytical sample had the proper NMR spectrum.

EXAMPLE 1

6-(4 - acetoxy-6-methoxy-7-methyl-3-oxo-5-phthalanyl)-4-methyl-4-hexenonitrile

To a solution of 6-(4-acetoxy-6-methoxy-7-methyl-3-oxo-5-phthalanyl)-4-methyl-4-hexenamide (20 g.) in 350 ml. of pyridine was added 35 g. of p-toluenesulfonyl chloride. The resulting solution was heated at 65–70° C. for three hours, then cooled to room temperature. Water (30 ml.) was added, and the solvent was removed in vacuo. The residue was dissolved in 500 ml. of chloroform and washed with 3 × 150 ml. of 1 N hydrochloric acid, then 150 ml. of water, followed by 150 ml. of a 5 percent sodium bicarbonate solution. The chloroform solution was dried over sodium sulfate; the solvent was removed in vacuo, and the residue was crystallized from benzene-hexane to yield 16 g. of product, M.P. 118–20° C. Anal. ($C_{19}H_{21}NO_5$) C, H, N.

EXAMPLE 2

1-(4-hydroxy - 6 - methoxy-7-methyl-3-oxo-5-phthalanyl)-3-methyl-5-(1H-tetrazolyl)-2-pentene To a solution of sodium azide (10.7 g.), ammonium chloride (9 g.) and lithium chloride (3 g.) in 80 ml. of dimethylformamide was added 18 g. of the product from Example 1. The resulting mixture was heated at 125–130° C. for three days. The solvent was removed in vacuo, and the residue was dissolved in 50 ml. of 1 N sodium hydroxide, then heated for 30 minutes on a steam bath. The solution was acidified with 3 N hydrochloric acid to pH 2, and the solids that precipitated were removed by filtration. The solids were digested with 2 l. of chloroform on a steam bath, and the insoluble residue was removed by filtration. The chloroform solution was dried over sodium sulfate; the chloroform was removed in vacuo, and the residue was recrystallized from ethanol to yield 8.6 g. of product; M.P. 181–84° C. Anal. ($C_{17}H_{20}N_4O_4$) C, H, N.

EXAMPLE 3

6-(4 - hydroxy-6-methoxy-7-methyl-3-oxo-5-phthalanyl)-4-methyl-4-hexenonitrile

To a solution of 15 ml. of ethanol and 15 ml. of 1 N sodium hydroxide was added 3 g. of the product from Example 1. The resulting solution was stirred for six hours. The solution then was neutralized with a 1 N hydrochloric acid solution, and the precipitate was removed by filtration. Recrystallization from benzene-hexane gave 1.7 g. of product, M.P. 142–44° C. Anal. ($C_{17}H_{19}NO_4$) C, H, N.

EXAMPLE 4

Ethyl 6-[4-(N,N - dimethylthionocarbamoyloxy) - 6 - methoxy - 7 - methyl-3-oxo-5-phthalanyl]-4-methyl-4-hexenoate To 12 g. of the ethyl ester of mycophenolic acid dissolved in 75 ml. of dimethylformamide was added 7.7 g. of 1,4-diazabicyclo[2.2.2]octane and 6.4 g. of dimethylthiocarbamoxyl chloride. The resulting solution was heated at 60–70° C. for 20 hours. Approximately 80 percent of the solvent was removed in vaco, and the remainder was poured into about 600 ml. of an ice water mixture. An oil formed on the bottom, and the aqueous layer was decanted. The oil was stirred in 300 ml. of distilled water; then 500 ml. of ether was added. The aqueous layer was separated and extracted with 300 ml. of ether. The combined ether fractions were then extracted twice with 125-ml. portions of ice-cold 1 N hydrochloric acid, then 4 times with 125-ml. portions of water. The ether was dried over sodium sulfate and removed in vacuo, and the residue was recrystallized from ethanol-hexane to yield 12.7 g. of product, M.P. 70–72° C. Anal. ($C_{22}H_{29}NO_6S$) C, H, N, S.

EXAMPLE 5

Ethyl 6-[4-(N,N-dimethylcarbamoylthio)-6-methoxy-7-methyl-3-oxo-5-phthalanyl]-4-methyl-4-hexenoate To a solution of 100 ml. of decaline and 15 ml. of xylene was added 10.2 g. of the product from Example 4. The resulting solution was heated under reflux under nitrogen for 64 hours. The solvent was removed in vacuo (flushing with xylene to remove the excess decaline), and the residue was recrystallized from ethanol-hexane to yield 8.8 g. of product, M.P. 80–81° C. Anal. ($C_{22}H_{29}NO_6S$) C, H, N, S.

EXAMPLE 6

6-(4-mercapto-6-methoxy-7-methyl-3-oxo-5-phthalanyl)-4-methyl-4-hexenoic acid

To a solution of 60 ml. of ethanol and 60 ml. of 2 N sodium hydroxide was added 6 g. of the product from Example 5. The resulting solution was heated under reflux under nitrogen for 23 hours. The ethanol was removed in vacuo, and the residue was dissolved in about 100 ml. of water. The pH was adjusted to about 2 with 6 N hydrochloric acid, and the resulting mixture was extracted with three 200 ml. portions of chloroform. The chloroform layer was washed with 200 ml. of water and then dried over sodium sulfate. The chloroform was removed in vacuo, and the residue was recrystallized from ethanol-hexane to yield 3.9 g. of product, M.P. 124–28° C. Anal. ($C_{17}H_{20}O_5S$) C, H, S.

EXAMPLE 7

6-[4-(N-ethylcarbamoyloxy)-6-methoxy-7-methyl-3-oxo-5-phthalanyl]-4-methyl-4-hexenoic acid To a solution of triethylamine (0.55 ml.) and 0.64 g. of mycophenolic acid in 25 ml. of dimethylformamide was added 0.5 ml. of ethyl isocyanate and the resulting solution was allowed to remain at room temperature for three hours. The solvent was removed in vacuo, and the residue was recrystallized from methanol to yield 0.3 g. of product; M.P. 148–50° C. Anal. ($C_{20}H_{25}NO_7$) C, H, N.

We claim:
1. A compound selected from the class having the formula

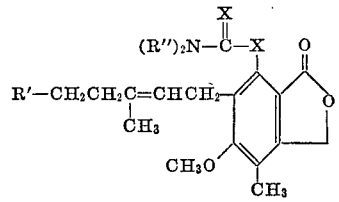

or

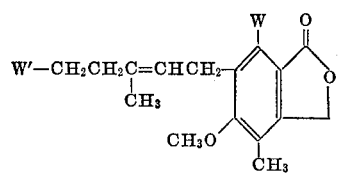

wherein
R' is

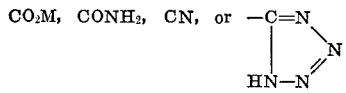

each X independently is oxygen or sulfur with no more than one being sulfur;
each R" independently is hydrogen, $C_1$–$C_4$ alkyl, or $C_1$–$C_4$ haloalkyl;
M is hydrogen, sodium, potassium, magnesium, calcium, $N(R''')_4$, or $C_1$–$C_2$ alkyl;
each R''' independently is hydrogen or $C_1$–$C_4$ alkyl;
W is

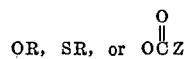

W' is

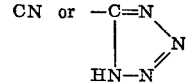

R is hydrogen, sodium, or potassium; and
Z is $C_1$–$C_4$ alkyl or $C_1$–$C_4$ haloalkyl.

2. The compound of claim 1 which is 6-[4-(N-ethylcarbamoyloxy)-6-methoxy - 7 - methyl - 3 - oxo-5-phthalanyl]-4-methyl-4-hexenoic acid.

3. The compound of claim 1 which is 6-(4-acetoxy-6-methoxy - 7 - methyl-3-oxo-5-phthalanyl)-4-methyl-4-hexenonitrile.

4. The compound of claim 1 which is 1-(4-hydroxy-6-methoxy - 7 - methyl - 3 - oxo - 5-phthalanyl)-3-methyl-5-(1H-tetrazolyl)-2-pentene.

5. The compound of claim 1 which is ethyl 6-[4-(N,N-dimethylthionocarbamoyloxy)-6 - methoxy - 7 - methyl-3-oxo-5-phthalanyl]-4-methyl-4-hexenoate.

6. The compound of claim 1 which is 6-(4-acetoxy-6-methoxy - 7 - methyl-3-oxo-5-phthalanyl)-4-methyl-4-hexenamide.

References Cited

South African Patent Journal, Mar. 25, 1970, vol. 3, No. 3, p. 153, col. 2 (abstract of South African Pat. 68/4,959).

Chemical Abstracts, vol. 71, abstract 94,783y (1969).
Chemical Abstracts, vol. 71, abstract 100236r (1969).

JOHN D. RANDOLPH, Primary Examiner

U.S. Cl. X.R.

424—269, 279; 260—343.3